United States Patent
Azulay et al.

(10) Patent No.: US 11,902,334 B2
(45) Date of Patent: Feb. 13, 2024

(54) PROXY SERVICES FOR CONTROLLING THE PERSISTENCY, UTILIZATION, AND DISSEMINATION OF INFORMATION PROVIDED TO A SERVICE WORKER

(71) Applicant: MICROSOFT TECHNOLOGY LICENSING, LLC, Redmond, WA (US)

(72) Inventors: Itamar Azulay, Mishmar Ayyalon (IL); Ishay Hilzenrat, Tel Aviv (IL); Sharon Itshak Lifshits, Tel Aviv (IL); Meir Blachman, Beer Sheva (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 183 days.

(21) Appl. No.: 17/355,691

(22) Filed: Jun. 23, 2021

(65) Prior Publication Data
US 2022/0417289 A1     Dec. 29, 2022

(51) Int. Cl.
*H04L 9/40* (2022.01)

(52) U.S. Cl.
CPC ........ *H04L 63/205* (2013.01); *H04L 63/0281* (2013.01); *H04L 63/1416* (2013.01); *H04L 63/1425* (2013.01); *H04L 63/1475* (2013.01)

(58) Field of Classification Search
CPC .................................................. H04L 63/205
See application file for complete search history.

(56) References Cited

U.S. PATENT DOCUMENTS

| 8,935,798 B1* | 1/2015 | Smith ................. G06F 16/9535 |
| | | 709/219 |
| 10,783,019 B1* | 9/2020 | Kedar ................... H04L 67/561 |
| 2005/0154837 A1* | 7/2005 | Keohane ............ G06F 16/9574 |
| | | 711/138 |
| 2014/0337991 A1* | 11/2014 | Croll ....................... G06F 21/60 |
| | | 726/26 |

(Continued)

OTHER PUBLICATIONS

"Best Practice for Caching Sensitive Data", Retrieved From: https://web.archive.org/web/20150727031116/https://security.stackexchange.com/questions/87144/best-practice-for-caching-sensitive-data, Jul. 27, 2015, 2 Pages.

(Continued)

*Primary Examiner* — William S Powers
(74) *Attorney, Agent, or Firm* — Shook, Hardy & Bacon L.L.P.

(57) ABSTRACT

The disclosure is directed towards controlling the persistency of information provided to a service worker. A method includes receiving a response that includes response data. The response is received at a security service and was transmitted by a second computing device in response to receiving an information request from a first computing device. The first computing device implements a service worker. Sensitive data included in the response data is identified. The response includes caching instructions that instruct the service worker to cache the sensitive data at the first computing device. In response to identifying the sensitive data, the caching instructions are updated such that any portion of the response data that the updated caching (Continued)

instructions instruct the service worker to cache at the first computing device excludes the sensitive data. The updated response is transmitted to the first computing device and includes the response data and the updated caching instructions.

17 Claims, 6 Drawing Sheets

(56) References Cited

U.S. PATENT DOCUMENTS

2017/0006128 A1* 1/2017 Graham-Cumming ...................... H04L 67/568
2019/0349733 A1* 11/2019 Nolan ...................... H04W 4/70
2020/0193042 A1 6/2020 Johns

OTHER PUBLICATIONS

"Caching Files with Service Worker", Retrieved From: https://web.archive.org/web/20210628152522/https://developers.google.com/web/ilt/pwa/caching-files-with-service-worker, Jun. 28, 2021, 13 Pages.

"Header Field Definitions", Retrieved From: https://web.archive.org/web/20210629171333/https://www.w3.org/Protocols/rfc2616/rfc2616-sec14.html, Jun. 29, 2021, 33 Pages.

"HTTP caching", Retrieved from: https://web.archive.org/web/20221217160311/https://developer.mozilla.org/en-US/docs/Web/HTTP/Caching, Dec. 17, 2022, 24 Pages.

"Service Worker", Retrieved from: https://web.archive.org/web/20220125013249/https://chromestatus.com/feature/6561526227927040, Jan. 25, 2022, 2 Pages.

"Service Worker Overview", Retrieved from: https://developer.chrome.com/docs/workbox/service-worker-overview/#cache_and_return_requests, Sep. 24, 2021, 5 Pages.

Curwin, et al., "Protect apps with Microsoft Defender for Cloud Apps Conditional Access App Control", Retrieved from:https://docs.microsoft.com/en-us/cloud-app-security/proxy-intro-aad, Dec. 25, 2022, 11 Pages.

Fielding, et al., "Hypertext Transfer Protocol (HTTP/1.1): Caching", Retrieved from: https://tools.ietf.org/html/rfc7234, Jun. 2014, 43 Pages.

González, et al., "ServiceWorkerWare", Retrieved from: https://github.com/fxos-components/serviceworkerware, Jul. 31, 2017, 7 Pages.

"International Search Report and Written Opinion Issued in PCT Application No. PCT/US22/029679", dated Aug. 30, 2022, 13 Pages.

* cited by examiner

US 11,902,334 B2

PROXY SERVICES FOR CONTROLLING THE PERSISTENCY, UTILIZATION, AND DISSEMINATION OF INFORMATION PROVIDED TO A SERVICE WORKER

BACKGROUND

Due to the wide adoption of the world wide web (aka the web) and cloud-based computing services, vast volumes of information is continuously transmitted between computing devices distributed across the globe. In typical usage, a user may employ a web browser (e.g., the Edge web browser) implemented by their computing system and a communication network to access a web-based or cloud-based application. The user may request information from the web/cloud application, via an information request transmitted, via the communication network, from the web browser to a web/cloud application server. The web/cloud application server may transmit the requested information to the web browser.

One or more parties may consider at least portions of the transmitted information as "sensitive information," e.g., user passwords, proprietary data, trade secrets, medical records, financial accounts, and the like. A party may be willing to have sensitive information provided to a user, such that the user may use the sensitive information for a specific and/or intended purpose. However, the party may wish the information to be ephemeral in nature, and after the information is employed for its intended purpose, the information may no longer be accessible. That is, the party does not want the user or other users with access to the user's computing system to copy, store, cache, print, or otherwise retain the information for further purposes other than its intended use. For example, an employer may permit their employees to receive sensitive information via a computing system they utilize for business purposes, but the employer wishes the information to be ephemeral or transitory in nature. In such scenarios, the sensitive information may be transmitted and/or received with the intention of a one-time consumption and/or use of the information.

However, in conventional computing systems, information tends to be more persistent than the party wishing to control the information intends it to be. Computing systems/networks and the digitization of information has provided inexpensive mechanisms for transmitting, copying, storing, and retrieving information. These mechanisms provide many advantages, such as the ability to quickly transmit medical records between medical professionals. However, once sensitive digitized-information is transmitted for a one-time consumption, the party that desires to inhibit further use of the information may not be able to insure that the information is contained to its one-time use. In the above example where a user is requesting information via their web browser, the user's web browser may cache or otherwise persist (e.g., storing in random access memory (aka RAM) or a storage disk)) the sensitive information. In such a scenario, the user (or other users with access to the user's computing system) may then access the sensitive information for purposes outside its intended one-time use.

Many modern web browsers implement a service worker. A service worker typically runs on the user's computing system and provide various services to a web/cloud application. In a typical scenario, a web application may employ a service worker to manage the caching of the information it sends to a web browser. For instance, a web application may provide the service worker with caching instructions. Such caching instructions may identify portions of the transmitted information, and instruct the web browser to cache or store the identified information for later retrieval. Thus, a service worker may cede some amount of control of the persistency of information to the web application. Accordingly, the employment of a service worker may make it more difficult for an interested party to control the persistency of information it considers sensitive.

SUMMARY

Various aspects of the technology described herein are generally directed to systems, methods, and computer storage media, for among other things, controlling the persistency, utilization, and dissemination of information provided to a service worker. One exemplary, but non-limiting, method may include receiving a response that includes response data. The response may be received at a security service. The response may have been transmitted by a second computing device, e.g., a web server. The second computing device may have transmitted the response in response to receiving an information request from a first computing device. The first computing device may implement a service worker. Sensitive data included in the response data may be identified at the security device. The response may further include caching instructions that instruct the service worker to cache the sensitive data at the first computing device. In response to identifying the sensitive data, the method may include updating the caching instructions. The caching instructions may be updated at the security service. The caching instructions may be updated such that any portion of the response data that the updated caching instructions instruct the service worker to cache at the first computing device excludes the sensitive data. The method may further include transmitting an updated response. The updated response may include the response data and the updated caching instructions. The updated response may be transmitted from the security service to the first computing device.

In some embodiments, the method may include analyzing the response data to identify the sensitive data. Analyzing the response data may be performed in response to determining that the response does not include an indication that the response data includes sensitive data. In at least one embodiment, an alert that indicates that the response includes sensitive data may be provided in response to identifying the sensitive data. In further response to identifying the sensitive data, the updated response may include sandbox instructions that instruct the service worker to isolate the sensitive data in a sandbox implemented at the first computing device.

In at least one embodiment, the method may further include employing caching logic, at the security service, to identify a portion of the response data to be cached at the security service. The portion of the response data identified with the caching logic may be cached in cache memory at the security service. The method may further include receiving, at the security service, another information request. The other information request may include a request for the portion of the response data identified with the caching logic. The other information request may be received from a third computing device. The cache memory at the security service may be employed to provide the portion of the response data identified with the caching logic to the third computing device.

In some embodiments, caching logic may be at the security service to identify a portion of the response data to be cached at the first computing device. The caching instructions may be updated at the security service. The caching instructions may be updated such that the updated caching instructions instruct the service worker to cache the portion of the response data identified with the caching logic at the first computing device. In at least one embodiment, updating the caching instructions may include inserting one or more application programming interface (API) function calls into the caching instructions.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Figure 1:
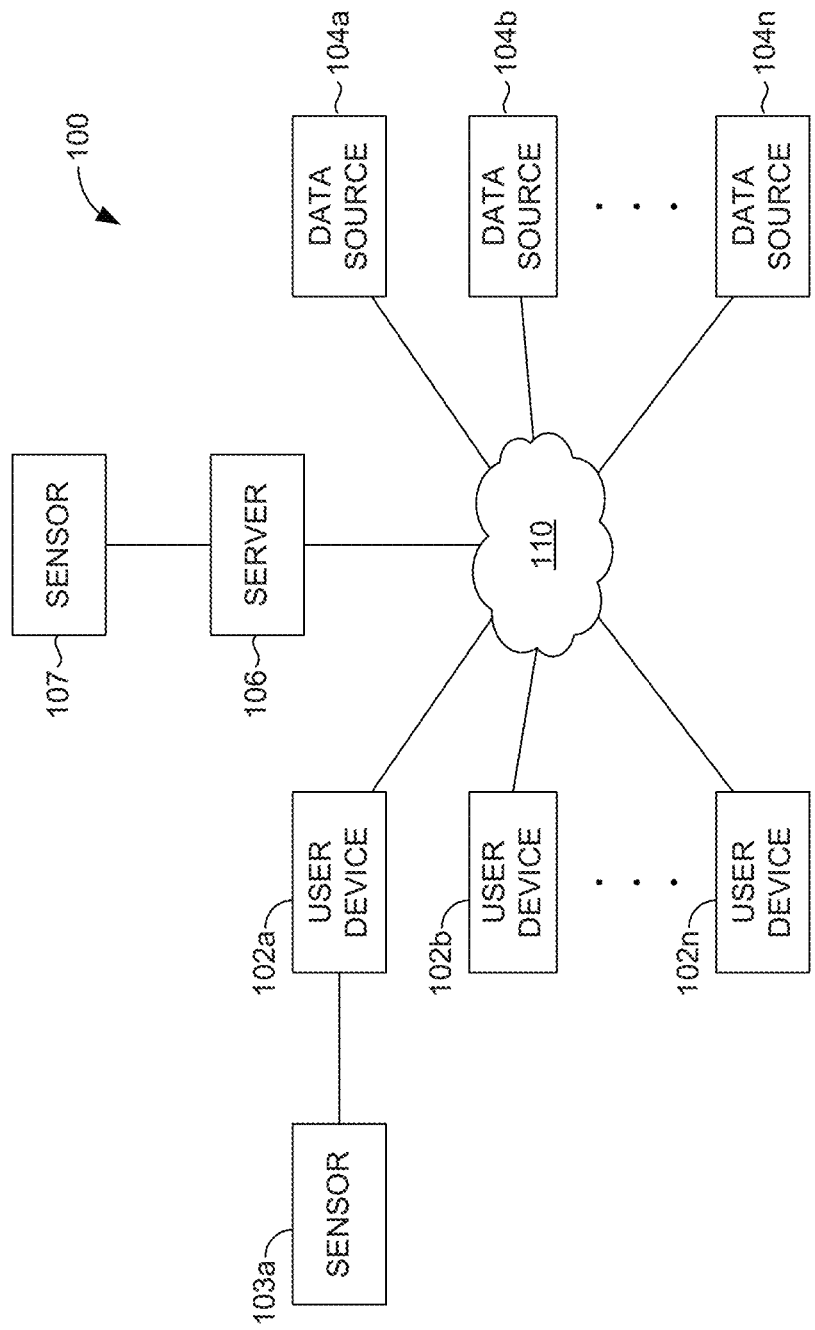
FIG. 1 illustrates a block diagram showing an example operating environment in which some embodiments of the present disclosure may be employed.

Overview of Technical Problems, Technical Solutions, and Technological Improvements As used herein, the term "set" may be employed to refer to an ordered (i.e., sequential) or an unordered (i.e., non-sequential) collection of objects (or elements), such as but not limited to machines (e.g., computer devices), physical and/or logical addresses, graph nodes, graph edges, and the like. A set may include N elements, where N is any non-negative integer. That is, a set may include 0, 1, 2, 3, ... N objects and/or elements, where N is a positive integer with no upper bound. Therefore, as used herein, a set may be a null set (i.e., an empty set), that includes no elements (e.g., N=0 for the null set). A set may include only a single element. In other embodiments, a set may include a number of elements that is significantly greater than one, two, three, or billions of elements. A set may be an infinite set or a finite set. In some embodiments, "a set of objects" that is not a null set of the objects may be interchangeably referred to as either "one or more objects" or "at least one object." A set of objects that includes at least two of the objects may be referred to as "a plurality of objects."

As used herein, the term "subset," is a set that is included in another set. A subset may be, but is not required to be, a proper or strict subset of the other set that the subset is included within. That is, if set B is a subset of set A, then in some embodiments, set B is a proper or strict subset of set A. In other embodiments, set B is a subset of set A, but not a proper or a strict subset of set A. For example, set A and set B may be equal sets, and set B may be referred to as a subset of set A. In such embodiments, set A may also be referred to as a subset of set B. Two sets may be disjoint sets if the intersection between the two sets is the null set.

The various embodiments are directed to controlling the use and dissemination of information provided to a computing system. As used herein, controlling the use and dissemination of information provided to the computing system may include controlling the persistency of the information in the computing system, as well as controlling which components and/or functionality of the computing system may have access to, or otherwise employ, the information. Accordingly, the embodiments may be employed to selectively control the caching, storing, printing, displaying, modifying, and/or re-transmitting of at least portions of information transmitted to the computing system. In particular, the embodiments may monitor data provided to the computing system (e.g., data provided by a web-based or a cloud-based application), via a proxy service. The embodiments may detect and/or identify "sensitive" information included in the monitored data. The use and dissemination of the detected sensitive information may be then be collectively controlled, whereas the use and dissemination of other "non-sensitive" data provided to the computing system may not be so constrained.

For example, the embodiments may prohibit the caching, short-term storing, or long-term storing of sensitive information provided to a user interface (UI) (e.g., a web browser) of a web-based and/or cloud-based application. Furthermore, the embodiments may be enabled to isolate such sensitive information from other components and/or functionalities of the computing system implementing the UI. Isolating the sensitive information may include providing the sensitive information to a non-leaky "sandbox" associated with the UI such that no other component and/or functionality of the user's computing system that is outside of the sandbox may read-write-modify the sensitive information. As used herein, a "sandbox" may be any computational mechanism that enables one or more particular components and/or functionalities of a computing system (e.g., UI) to access particular information (e.g., sensitive information), while isolating, constraining, and/or quarantining the particular information from other components and/or functionalities of the computing system (e.g., printing or saving functionalities). For instance, when sandboxed, the sensitive information may not be printed, viewed, stored, committed to memory, or transmitted beyond the UI's sandbox. Accordingly, by controlling the persistency, use, and dissemination of sensitive information, the sensitive information may not be used outside of an intended one-time use within the UI.

In the following discussion, the UI for a web-based or cloud-based application may be a web browser. However, the embodiments are not so limited, and other UI's may be employed in a similar fashion. For example, some cloud-based applications have a local application that is installed and run locally on a user's computing system. Although the corresponding application is executed locally, its operations may depend upon communicating with a remote application server that provides the local application with data. The local application may implement its own corresponding UI that is specific to the cloud-based application and depends upon data provided by the cloud-based application. The various embodiments may be applied to such local applications.

Some web browsers may implement a service worker (or another such similar mechanism) to control the caching and/or sandboxing of data. For instance, when providing data to a client (e.g., a web browser or other UI), a web/cloud-based application may provide caching and/or sandboxing instructions for the provided data. The caching instructions may identify a first subset of the provided response data and include instructions (e.g., application specific interface (API) function calls) to the service worker that instruct the service worker to cache the identified first subset of provided data on the user's computing system. Similarly, the sandboxing instructions may identify a second subset of the provided response data and include instructions to the service worker to sandbox the identified second subset of provided data in the web browser's sandbox. As discussed below, prior to delivery to the service worker, the various embodiments are enabled to intercept any response data, caching instructions, and/or sandbox instructions provided by the web/cloud application. The various embodiments may provide alternative or modified caching and/or sandbox instructions to the service worker. For example, caching instructions may be provided to the service worker that inhibit the caching of sensitive information. Likewise, sandbox instructions may be provided to the service worker that force the sandboxing of sensitive information. That is, rather than providing the caching and sandboxing instructions, as formulated by the web/cloud application, the various embodiments provide updated or alternative caching and sandbox instructions to the service worker.

The sensitive information may be controlled/contained via a web security service (WSS) that is provided to a computing system that implements a web browser (or a UI) to communicate with a web-based or cloud-based application. The WSS may be a proxy service for the user's computing system. The WSS may be (logically) positioned within a communication channel (of a communication network) employed by the computing system and a web/cloud server to communicate, e.g., the computing system may be in between the user's computing system and the application's server. Accordingly, the WSS may be enabled to intercept and relay communications between the user's computing system and the web/cloud server. The WSS may be enabled to analyze the intercepted data packets. Based on the analysis, the WSS may be enabled to selectively modify at least portions of the data packets prior to relaying the data packets to their intended destination within the communication channel. In this way, the WSS may control and modify the information transmitted between the user and the web/cloud application.

In a non-limiting example, a user may be accessing the web/cloud application via a web browser implemented by their computing system. When communicating with the application, the web browser may transmit an information request to the web/cloud server. The WSS may intercept and relay the information request to the web/cloud server. The web/cloud server may transmit a response to the web browser. The response may include the requested information (e.g., requested data). In some embodiments, when a service worker is employed, the response may additionally include caching instructions. The caching instructions may identify at least a portion of requested information that the web/cloud application intends to be cached by the user's computing system. The WSS may intercept the response data and caching instructions. Prior to forwarding the response to the user's web browser, the WSS may analyze the response data. More specifically, the WSS may be enabled to detect and/or identify any "sensitive" information included in the response data. In various embodiments, the user, an administrator of the user's computing system, or another individual that has access to control various aspects of the WSS when acting as a proxy servicer for the user's system, may be enabled to define and/or characterize as to what information is considered as "sensitive" in response data. The WSS may modify the response data and/or caching instructions such that the modified caching instructions do not indicate the caching of any information that has been identified as sensitive information. Accordingly, only information that has not been identified as sensitive information may be cached by the user's computing system.

Some web browsers may implement a sandbox feature, where the sandbox acts to contain any information inserted into the sandbox. That is, the sandbox is a non-leaky container, and information inserted into the sandbox may not be provided to other components of the web browser or the user's computing system. Some web browsers may implement such a sandbox feature via a service worker. In the various embodiments, the WSS may modify the response to include or modify sandbox instructions, such that any response information identified as sensitive information may be provided only to the browser's sandbox feature, and may not be provided to any other components of the user's web browser or computing system. In such a way, the embodiments are enabled to prohibit sensitive information from being saved, cached, printed, view, or transmitted by the computing system.

In addition to limiting the persistency and/or dissemination of sensitive information, the various embodiments may enhance the performance of the remote application for the user or other users of the computing system. For example, when scanning or analyzing the response data for sensitive information, the WSS may identify a subset of the response data that may be useful to other users of the WSS or the user's computing system. The WSS may identify this "WSS subset" of the response data and cache the WSS subset at the WSS. When the WSS received additional information that request the same information, the WSS may provide the cached WSS to the users requesting it, without having relay the information request to the remote application server. Additionally, the WSS may identify a "client subset" of the response data that may be beneficial to cache on the user's computing device. For example, the WSS may identify a subset of the information that may be re-usable by the user, but that the caching instructions received from the remote application do not indicate to cache. The WSS may updated the caching instruction to instruct the service worker to cache the client subset of the response data at the user's computing device. When the client subset of the response data is cached at the user's computing device, the performance of the remote application may be increased for the user because if a portion of the client subset of the response data is requested again, the cached information is available.

Accordingly, the various embodiments may improve the security of a computing system by limiting the persistency and re-usability of sensitive information provided to a computing system. Additionally, the various embodiments may enhance the performance of a remote application by making intelligent decisions, as to which portions of response data may be cached at a user's computing device and which portions of the response data may be cached at a proxy service employed by the user, as well as other users.

Overview of Environments for Controlling
Information Provided to a Service Worker Aspects of the technical solution can be described by way of examples and with reference to FIG. 1 and additional illustrations below. FIG. 1 illustrates a block diagram showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107; and communication network 110. It should be understood that environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 110, which may include, without limitation, a local area network (LAN) and/or a wide area networks (WAN). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 8 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100; data structures 120, 140, and 160 described in connection to system 200 described in connection to FIG. 2. Data sources 104a and 104b through 104n may be discrete from user devices 102a and 102b through 102n and server 106 or may be incorporated and/or integrated into at least one of those components. In one embodiment, of data sources 104a through 104n comprise sensors 103a, 107, which may be integrated into or associated with the user device(s) 102a, 102b, or 102n or server 106. Examples of sensed user data made available by data sources 104a through 104n may include events.

Figure 2:
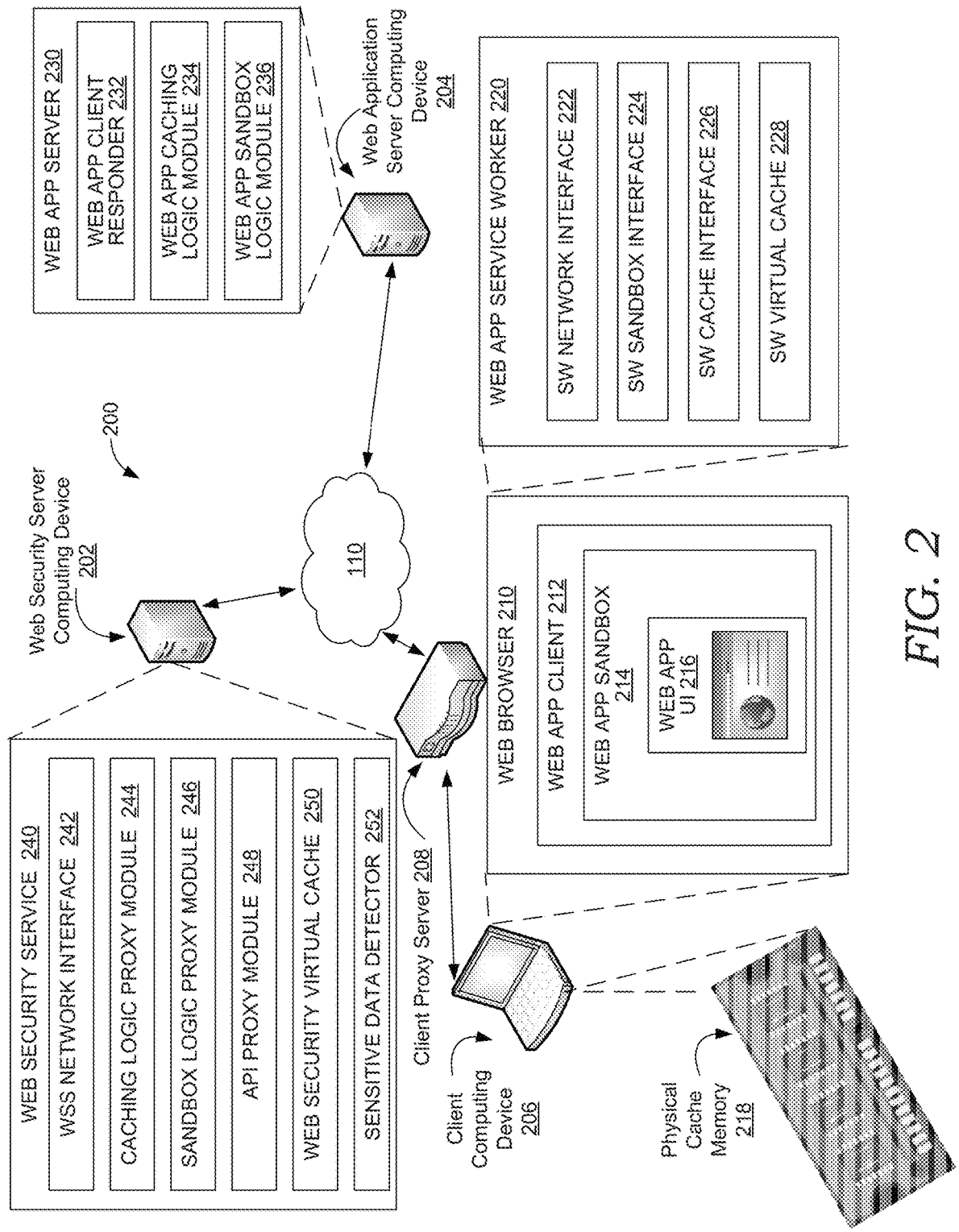
FIG. 2 illustrates a block diagram showing an example web security system in which some embodiments of the present disclosure may be employed.

Operating environment 100 can be utilized to implement a component of the components of an enhanced web security system 200, described in FIG. 2, including components for controlling the persistency, utilization, and dissemination of information. Operating environment 100 also can be utilized for implementing aspects of process flows 300 and 400 described in conjunction with FIGS. 3A-4.

Overview of Example of Controlling the
Persistency, Use, & Dissemination of Information FIG. 2 illustrates a block diagram showing an example web security system 200 in which some embodiments of the present disclosure may be employed. System 200 may be implemented via one or more components of environment 100 of FIG. 1. System 200 may include web security service (WSS) 240 implemented by one or more computing devices (e.g., web security server computing device 202). System 200 may additionally include a client computing device 206 and a web application server computing device 204. In some non-limiting embodiments, system 200 may include a client proxy server 208. The web security server computing device 202, the web application server computing device 204, the client computing device 206, and/or the client proxy server 208 may be communicatively coupled via communication network 110 of FIG. 1. The client computing device 206 may include physical cache memory 218.

The web application server computing device 204 may host or otherwise implement a web application server 230. The web application server 230 may be a server for an application (e.g., a web-based application). The application may be enabled via a web application server 230 that is implemented by the web application server computing device 204. Note that although the following discussion labels the application as a web application, the application may alternatively be a cloud-based application (e.g., a cloud application). Accordingly, the web application server computing device 204 may be a cloud application server computing device and the web application server 230 may be a cloud application server.

The WSS 240 may provide web (or cloud) security proxy services to the client computing 206. In embodiments where the application is a cloud application, rather than a web application, the web security server computing device 202 may be a cloud security server computing device and the WSS may be a cloud security service. Whether the application is a web-based application or a cloud-based, the WSS 240 may provide security services for controlling the persistency, utilization, and dissemination of information provided that the application provides to the client computing 206.

To interact with and employ the application, a user may employ the client computing device 206. More particularly, to employ the web/cloud application, the user may employ a local application that is locally installed on and at least partially executed by the client computing device 206 (e.g., web browser 210 or another local application corresponding to the web/cloud application). The client proxy server 208 may be employed to re-direct or otherwise divert any communication network 110 between the client computing device 208 and the web/cloud application to the WSS 240. As a proxy service, the WSS 240 may monitor, analyze, modify, and relay any such re-directed traffic to its intended destination.

The web application server 230 may include a web application client responder 232, a web application caching logic module 234, and a web application sandbox logic module 236. The web browser 210 may include a web application client 212, which may include a web application sandbox 214. The web browser may host a UI for the application (e.g., web app UI 216). A display of at least a portion of the web app UI 216 may be included in the web application sandbox 214. The web browser 210 may implement a web application service worker (SW) 220. The web application SW 220 may include a SW network interface 222, a SW sandbox interface 22, a SW cache interface 226, and a SW virtual cache 228. The WSS 240 may include a WSS network interface 242, a caching logic proxy module 244, a sandbox logic proxy module 246, an application programming interface (API) proxy module 248, a web security virtual cache 250, and a sensitive data detector 252.

The functionalities of these various components will be discussed at least in conjunction with FIGS. 3A-3B. However, briefly here, a user of client computing device 206 may employ the web browser 210 to access the web/cloud application. An application server/client architecture may be employed, such that the web application server 230 is generally responsible for implementing the application on the server side (e.g., via web application server computing device 204) and the web application client 212 is generally responsible for implementing the application on the client side (e.g., via client computing device 206). Thus, the term client side may be employed to refer to a first portion of system 200 that includes components (and their subcomponents) such as the client computing device 206, the web browser 210, the web application service worker 220, and the client proxy server 208. The term sever side may be employed to refer to a second portion of system 200 that includes components (and their subcomponents) such as the web application server computing device 204 and the web application server 230. The term proxy side may be employed to refer to a third portion of system 200 that includes components (and their subcomponents) such as the web security server computing device 202 and the WSS 240. The client proxy server 208 is generally responsible for re-directing traffic between the web application server 230 and the web application client 212 to the WSS 240. For example, the web application client 212 may transmit an information request to the web application server 230. The WSS 240 may intercept the information request via a redirection by the client server proxy 208. The WSS 240 may relay the information request to the web application server 230.

The web application client responder 232 is generally responsible for generating a response to the information request. The response may include the requested information (e.g., response data). For embodiments where the web browser 210 implements a service worker (e.g., web app service worker 220), the response may additionally include caching instructions for the response data. The caching instructions may identify a first subset (or portion) of the response data to be cached in the SW virtual cache 228 on the client side. The web application caching logic module 234 of the web application server 230 is generally responsible for generating the caching instructions. The caching instructions may be encoded in one or more API function calls to the web application service worker 220. The SW virtual cache 228 may be a virtualized storage component implemented via the physical cache memory 218 of client computing device 206. The SW network interface 222 is generally responsible for receiving the response, including the cache instructions. The SW cache interface 226 of the web application service worker 220 is generally responsible for implementing the cache instructions and at least temporarily storing the first subset of the response data in the SW virtual cache 228.

For embodiments where the web browser 210 and/or the web application service worker 210 implements a sandbox (e.g., web application sandbox 214), in addition to the response data, the response may include sandbox instructions. The sandbox instructions may identify a second subset (or portion) of the response data to be sandboxed (e.g., quarantined or isolated) in the web application sandbox 214 of the web browser 210. The web application sandbox logic module 236 of the web application server 230 is generally responsible for generating the sandbox instructions. The sandbox instructions may be encoded in one or more API function calls to the web application service worker 220. As discussed previously, the web application sandbox 214 is generally responsible for isolating or quarantining any data inserted into the web application sandbox 214 (e.g., at least a portion of the display of the web application UI 216). The SW sandbox interface 224 of the web application service worker 220 is generally responsible for implementing the sandbox instructions and at least quarantining or isolating the second subset of the response data in the web application sandbox 214.

The web application client responder 232 on the server side may transmit the response (including the response data, the caching instructions, and the sandbox instructions) to the web application client 212. Prior to delivery to the client computing device 206, the response may be diverted to the WSS 240, via the client proxy server 208. The WSS network interface 242 may be enabled to receive the response. The WSS 240 may be enabled to control the use and dissemination of information (e.g., response data) provided to the client-computing device 206. As used herein, controlling the use and dissemination of information provided to the client-computing device 206 may include controlling the persistency of the information in the client-computing device 206, as well as controlling which components and/or functionality of the client-computing device 206 may have access to, or otherwise employ, the information. Accordingly, the WSS 240 may be employed (as a proxy service) to selectively control the caching, storing, printing, displaying, modifying, and/or re-transmitting of at least portions of information transmitted to the client computing device 206. In particular, WSS 240 may monitor the response data provided to the client-computing device 206 by the web application server 230. The embodiments may detect and/or identify "sensitive" information included in the monitored data. The use and dissemination of the detected sensitive information may be then be collectively controlled, whereas the use and dissemination of other "non-sensitive" data may not be so constrained.

The WSS 240 may analyze the response data included in the response intercepted from the web application server 230. The sensitive data detector 252 may be enabled to detect and/or identify any "sensitive" information included in the response data. In various embodiments, a user of the client computing device 206, an administrator of the client computing device 206, or another individual that has access to control various aspects of the WSS 240, may be enabled to define and/or characterize as to what information is considered as "sensitive" in response data. In some embodiments, at least two "characterizations" of what constitutes "sensitive" information may be defined within the WSS. A first characterization may be referred to as "caching logic" and a second characterization may be referred to as "sandbox logic." Caching logic may define which sensitive information that will be prohibited from being cached at the client side (e.g., by SE virtual cache 228). Sandbox logic may define which sensitive information will be sandboxed at the client side (e.g., by the web application sandbox 214). The information types or classifications defined by each of these two variants of "information detection logic" may be defined via logic, heuristics, rules, explicit definitions, or the like. In at least one embodiments, a binary classifier may be trained (e.g., via supervised learning) to "deeply learn" the features of information that are correlated with sensitive information for the purposes of sandboxing or the prohibition of caching. In some embodiments, one or more neural networks (e.g., a multilayer perceptron) may implement the caching logic or the sandbox logic.

The caching logic proxy module is generally responsible for encoding or implementing the caching logic. Likewise, the sandbox logic proxy module 246 is generally responsible for encoding or implementing the sandbox logic. The sensitive data detector 252 may implement each of the caching logic and the sandbox logic, as encoded in the caching logic proxy module 244 and the sandbox logic module 246 respectively. That is, the sensitive data detector 252 may employ the caching logic to detect or identify a first subset of the response data that constitutes a first type of sensitive information that will be prohibited from being cached at the client computing device 206. The sensitive data detector 252 may employ the sandbox logic to detect or identify a second subset of the response data that constitutes a type of sensitive information that will be sandboxed by the web application sandbox 214.

In some embodiments, the sensitive data detector 252 may be enabled to identify and select a third subset of the response data. The third subset of the response data may include response data that is to be cached at the web security virtual cache 250. For instance, the WSS 240 may cache portions of the response data at the web security virtual cache 250, such that cache portion of the response data may be quickly accessed and provided to other users of the WSS 240 that subsequently request the same data from the web application server 230. Web security virtual cache 250 may be a virtualized cache that is implemented via physical cache memory (e.g., not shown in FIG. 2) of the web security server computing device 202. A user or administrator of the WSS 240 may define "WSS cache logic" and encode the WSS cache logic in the caching logic module 244. Note, that in contrast to the cache logic discussed above (which defines what data not to cache on the client side), the WSS cache logic defined data to cache locally on the proxy side. The sensitive data detector 252 may be enabled to detect or identify the portion of the response data that is to be cached at the web security virtual cache 250 (e.g., the third subset of the response data) by implementing the WSS cache logic. The sensitive data detector 252 may be further enabled to cache the identified third subset of the response data in the web security virtual cache 250.

In addition to WSS cache logic, the caching logic proxy module 244 may implement additional logic to identify a fourth subset of the response data that is to be cached at the client side. This fourth subset of response data may include data that the WSS determines to be useful to cache at the client side, of which the original cache instructions (provided by the remote application) did not identify to cache at the client side. Caching response data, either at the client side or the proxy side, may enhance the performance of the remote application for the user, other users of the client-computing device 206, and/or other users of the WSS 240.

The WSS 240 may modify the response. That is, the WSS 240 may be enabled to modify any of the response data, the caching instructions, and/or the sandbox instructions based on the identification of the sensitive data to not be cached at the client side and/or the sensitive data to be sandboxed at the client side. As noted above, the caching instructions and the sandbox instructions may be encoded via one or more API calls to the web application service worker 220. The API proxy module 248 is enabled to modify the original API calls in the original caching and sandbox instructions, such that the modified or updated API calls are consistent with the goals and/or tasks if prohibiting the caching of the first subset of sensitive response data at the client side and sandboxing the second subset of sensitive response data to be sandboxed at the client side. In some embodiments, the API proxy module 248 is enabled to generate new or alternative API calls to accomplish the same caching and sandbox-related goals or tasks. For example, new API calls may be generated in cases when the response does not include caching and/or sandbox instructions.

The WSS network interface 241 is generally responsible for forwarding the updated or modified response onto the client computing device 206. The client proxy server 208 may be employed to forward the modified response to the client computing device 206. The modified response may be forwarded to the web application service worker 220. As discussed above, the SW network interface 222 may receive the modified response. The SW cache interface 226 may implement the modified and/or alternative caching instructions to prohibit the first subset of sensitive data (e.g., the portion of the response data that is indicated by the modified and/or alternative caching instructions) from being cached in the SW virtual cache 228. The SW sandbox interface may implement the modified and/or alternative sandbox instructions to sandbox the second subset of sensitive data (e.g., the portion of the response data that is indicated by the modified and/or alternative sandbox instructions) in the web application sandbox 214.

Figure 3A:
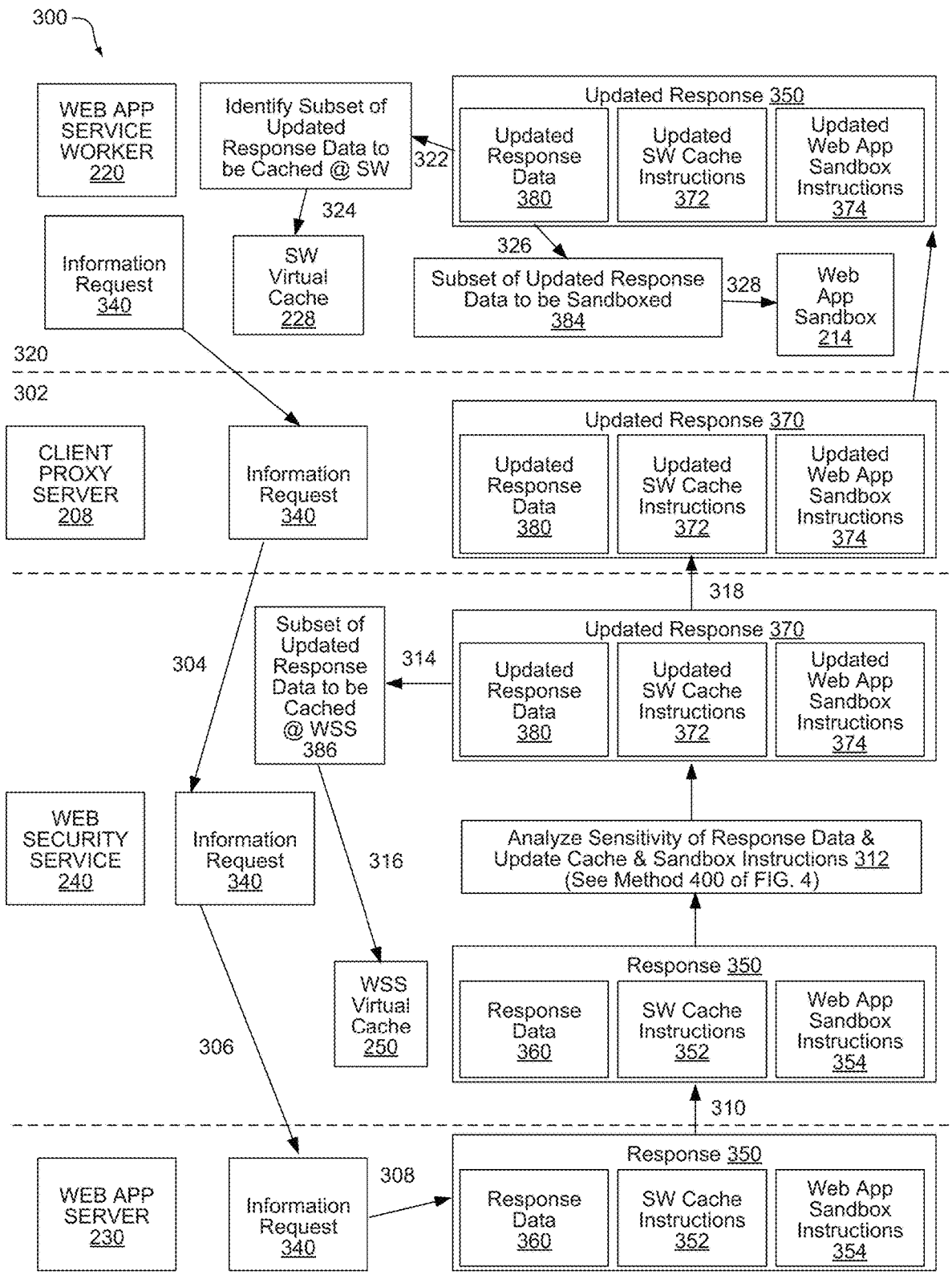
FIG. 3A illustrates an example workflow implemented by the web security system of FIG. 2.
Figure 3B:
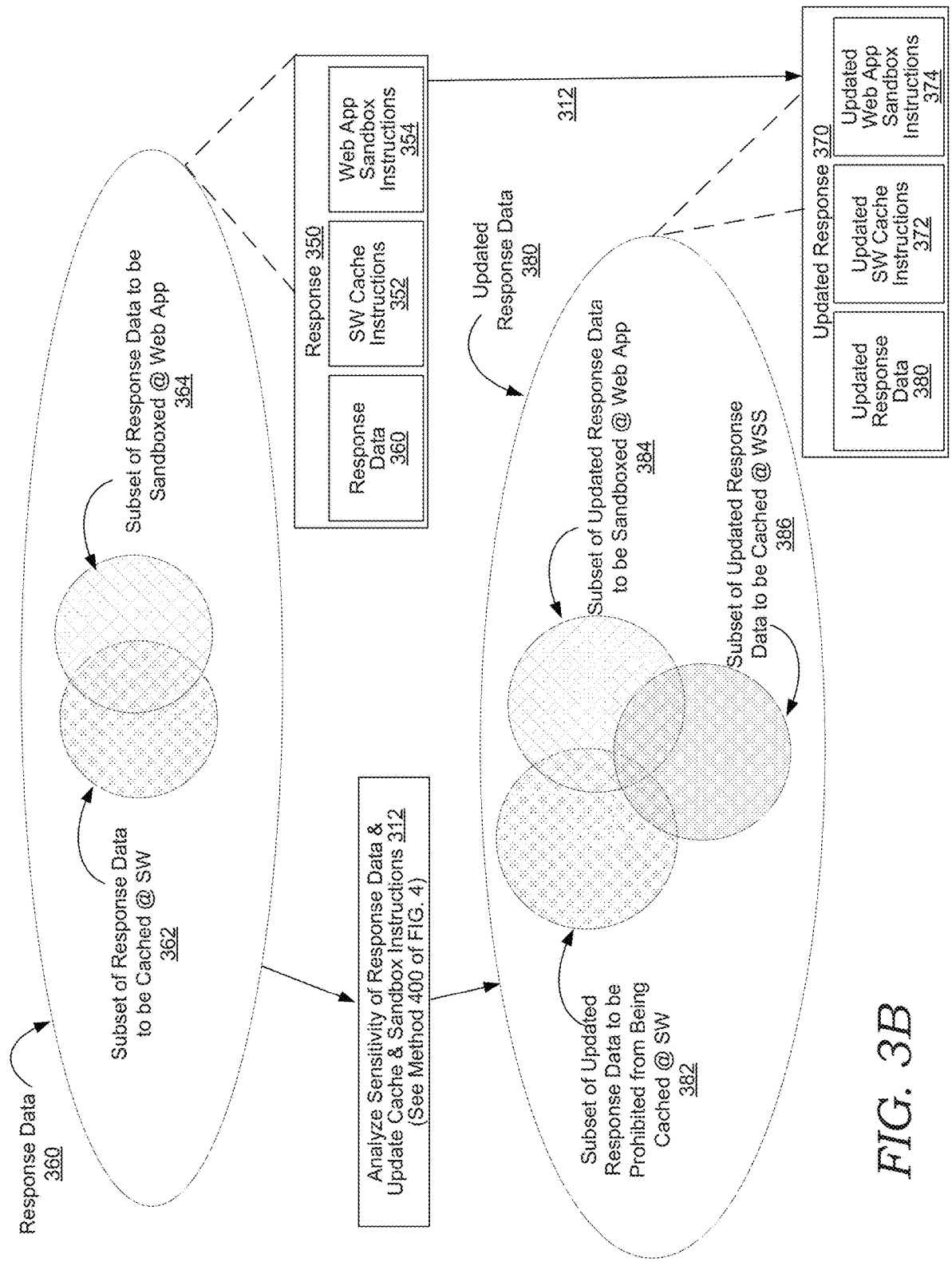
FIG. 3B provides a graphical illustration of the subsets of response data to be cached and sandboxed, via the workflow of FIG. 3A.

FIG. 3A illustrates an example workflow 300 implemented by the web security system 200 of FIG. 2. FIG. 3B is discussed in conjunction with workflow 300 of FIG. 3A. FIG. 3B provides a graphical illustration of the subsets of response data to be cached and sandboxed, via workflow 300 of FIG. 3A. At step 302 of workflow 300, the web application service worker 220 transmits an information request 340. The information request may be received by the client proxy server 208. In some embodiments, the SW network interface 222 may forward the information request 340 to the client proxy server 208. At step 304 of workflow 300, the client proxy server 208 may forward the information request 340 to the web security service 240. The WSS network interface 242 may receive the information request. At step 306 of workflow 300, the WSS network interface 242 may forward the information request to the web application server 230.

At block 308 of workflow, the web application client responder 232 may generate a response to the information request, e.g., response 350. Response 350 may include response data 360, service worker cache instructions 352, and web application sandbox instructions 354. The response data 360 may be a set of response data, as shown in the upper Venn diagram of FIG. 3B. The service worker cache instructions 352 identifies a first subset of the response data 360 that is to be cached at the SW virtual cache 228 (e.g., subset 362 in the upper Venn diagram of FIG. 3B). The web application sandbox instructions 354 identifies a second subset of the response data 360 that is to be sandboxed at the web application client 212 (e.g., subset 364 in the upper Venn diagram of FIG. 3B). In some embodiments, the intersection of subset 362 and subset 364 may be the null set. In some embodiments, the response 350 may not include at least one of the SW cache instructions 352 of the web application sandbox instructions 354.

At step 310 of workflow 300, the web application server 230 may transmit the response 350 to the web application service worker 220. As shown in FIG. 3B, the WSS 240 may intercept the response 350. Although not shown in workflow 300, client proxy server 208 may receive the response 350 at step 310 and forward the response 350 to the WSS 240. The WSS network interface 242 may be enabled to receive the response 350.

At step 312, the sensitivity of the response data 360 may be analyzed. Also at step 312, the SW cache instructions 352 and the web application sandbox instructions 354 may be updated. Various embodiments of analyzing the response data 360 and updating the SW cache instructions 352 and the web application sandbox instructions 354 are discussed in conjunction with method 400 of FIG. 4. However, briefly here, the sensitive data detector 352 may be enabled to detect one or more sensitive subsets of the response data 360. The response 350 may be updated and/or modified to generate an updated response. The updated response 370 may include updated response data 380, updated SW cache instruction 372, and updated web application sandbox instructions 374. In some embodiments, the updated response data 380 may be equivalent to the response data 360. In other embodiments, the updated response data 380 may be a subset of the response data 360 or may be an alternative set of response data that includes modified portions of the response data 360. A transformation of the response data 360 to the updated response data 380, via step 312 of workflow 300, is shown in FIG. 3B. The updated response data 380 is shown in the lower Venn diagram of FIG. 3B. The transformation of the response 350 into the updated response 350 is also shown in FIG. 3B, where the response 350 is shown in the upper portion of FIG. 3B, and the updated response 370 is shown in the lower portion of FIG. 3B.

In various embodiments, at step 312, the sensitive data detector 252 implements the caching logic encoded in the caching logic proxy module 244 to detect a first subset of information in the updated response data 380. More particularly, the sensitive data detector 252 is enabled to implement the caching logic to identify a first subset of the of the updated response data 380 that is to be prohibited from caching at the client side. This first subset of sensitive response data that is to be prohibited from being cached at the SW virtual cache 228 is shown in the lower Venn diagram of FIG. 3B as subset 382. The API proxy module 248 may be employed to update and/or generate the updated SW cache instructions 372 (via one or more API calls) to prohibit the caching of the first subset 382 at the client side.

The sensitive data detector 252 may implement the sandbox logic encoded in the sandbox logic proxy module 246 to detect a second subset of information in the updated response data 380. More particularly, the sensitive data detector 252 is enabled to implement the sandbox logic to identify a second subset of the of the updated response data 380 that is to be sandboxed at the client side. This second subset of sensitive response data that is to be sandboxed at by the web application sandbox 214 is shown in the lower Venn diagram of FIG. 3B as subset 384. The API proxy module 248 may be employed to update and/or generate the updated web application sandbox instructions 374 (via one or more API calls) such that the second subset 384 is sandboxed at the client side.

In various embodiments, at step 314 of workflow, the sensitive data detector 252 implements WSS caching logic encoded in the caching logic proxy module 244 to detect a third subset of the updated response data 380. More particularly, the sensitive data detector 252 is enabled to implement WSS caching logic to identify a third subset of the of the updated response data 380 that is to be cached at the web security virtual cache 250. This third subset of the updated response data 380 that is to be cached at the proxy side is shown in the lower Venn diagram of FIG. 3B as subset 386. At step 316 of workflow 300, the third subset (subset 386) of the updated response data 380 may be cached at the WSS virtual cache 250. Note that the lower Venn of FIG. 3B is drawn if illustrate the most general intersection of three subsets of data. Note that in some embodiments, the three subsets of the updated response data 380 may not form the most generalized version of three subset. For example, subsets 382 and 384 may be equivalent subsets. Third subset 386 may be completely disjoint from each of the first subset 382 and the second subset 384.

At step 318 the updated response 370 may be transmitted. The client proxy server 208 may intercept the updated response 370. At step 320, the client proxy server 208 may forward the updated response 370 to the web application service worker 220. The SW network interface 222 may be enabled to receive the updated response 370. At step 322, the SW cache interface 226 may be enabled to implement the updated SW cache instructions 374 to identify a subset of the updated response data 352. At step 324, the SW cache interface 226 may cache the identified subset of the response data at the SW virtual cache 228. Note that the intersection of the subset identified at step 324 and subset 328 may be the null set. At step 326, the SW sandbox interface 224 may implement the updated web application sandbox instructions 374 to identify the sensitive subset of the updated response data (e.g., subset 384) to be sandboxed at the client side. In step 328, the SW sandbox interface 224 may sandbox subset 384 of the updated response data 370 at the web application sandbox 214.

Figure 4:
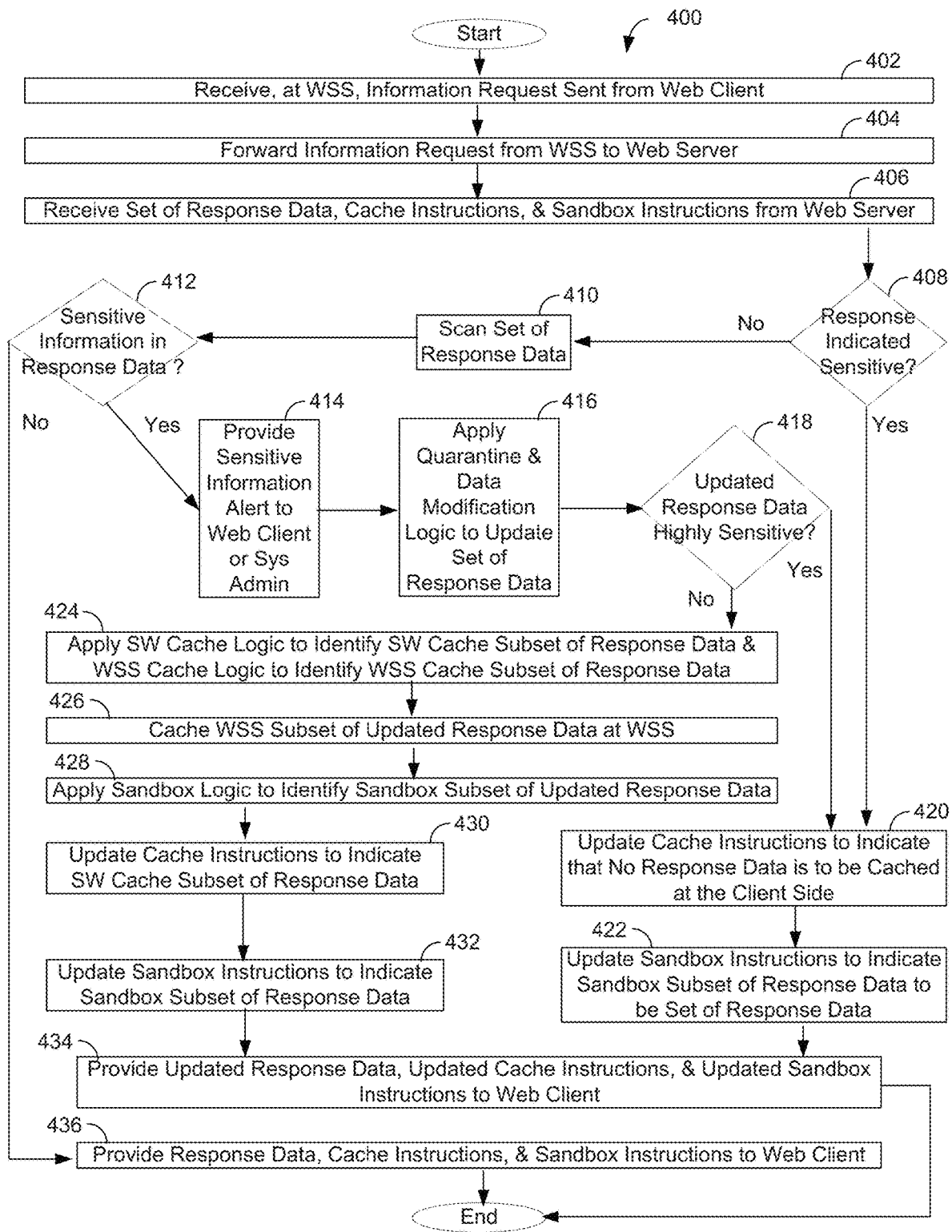
FIG. 4 provides a flow diagram that illustrates a method for controlling the persistency, utilization, and dissemination of information provided to a service worker.

Example Methods for Controlling the Persistency, Use, & Dissemination of Information Turning to FIG. 4, a flow diagram is provided that illustrates a method 400 for controlling the persistency, utilization, and dissemination of information provided to a service worker. The method may be implemented and/or performed by using any of the embodiments of a web security service (WSS), such as but not limited to WSS 240 of FIGS. 2-3A. In embodiments, one or more computer storage media having computer-executable instructions embodied thereon that, when executed, by one or more processors can cause the one or more processors to perform the methods in the storage system. Generally, the flow diagram of FIG. 4 can be implemented using the architectures described above at least in conjunction with FIGS. 1-3B. For example, any suitable combination of portions of method 400 may be implemented by WSS 240.

Initially, method 400 begins at block 402, where an information request (e.g., information request 340 of FIG. 4) is received at a WSS (e.g., WSS 240 of FIGS. 2-3A). The information request may have originated from or been sent from a web client (e.g., web application client 212 of FIG. 2) implemented by a client-computing device (e.g., client computing device 206 of FIG. 2). The information request may have be generated by a web browser (e.g., web browser 210 of FIG. 2) implemented by the client-computing device. The web browser may implement a service worker (e.g., web application service worker 220). At block 404, the information request may be forwarded from the WSS to a web server (e.g., web application server 230 of FIGS. 2-3A). The information request may be transmitted from the client-computing device, with an intended destination of a server computing device (e.g., web application server computing device 204 of FIG. 2). A proxy server (e.g., client proxy server 208) may intercept the information request and forward the information request to the WSS.

At block 406, a response is received from the web server. The response (e.g., response 350 of FIGS. 3A-3B) may be received at the WSS. The response may include at least one of response data (e.g., response data 360 of FIGS. 2-3A), caching instructions (SW caching instructions 352), and/or sandbox instructions (e.g., web application sandbox instructions 354). The response data may be a set of response data. The set of response data may include a subset of response data that is "sensitive data," a subset of sensitive data. In some embodiments, when the response data includes sensitive data (e.g., sensitive information) the response may additionally include an indication that the response data includes the sensitive data. The WSS may have intercepted the response, in transit from the web server to the client computing device. A proxy server (e.g., client proxy server 208 of FIGS. 2-3A) may have intercepted the response and forwarded to the WSS. At decision block 408, it is determined whether the response includes an indication that the response data includes sensitive information. If the response does include an indication that the response data includes sensitive data, method 400 may flow to block 420. If the response does not include an indication that the response data includes sensitive data, method 400 may flow to block 410.

At block 410, the response data is scanned. Scanning the response data may include analyzing the response data to determine whether the response data includes sensitive data, even though the response did not include an indication that the response data includes sensitive data. IF the response data includes sensitive data, the subset of sensitive data is detected and/or identified at block 410. At decision block 412, method 400 may fork. If sensitive data is detected in the response data at block 410, then method 400 may flow to block 414. If no sensitive information was detected in block 410, then method 400 may flow to block 436. At block 436, the response (e.g., the response data, the cache instructions, and the sandbox instructions) are provided to the web client (e.g., web application client 212 of FIG. 2). After executing block 436, method 400 may terminate.

At block 414, a sensitive information alert may be provided. The sensitive information alert may include an indication that the response from the web server includes sensitive information. The sensitive information alert may be provided to the web client and/or a systems administrator (e.g., an administrator or super-user of the client-computing device 206).

In some embodiments, the WSS may be enabled to modify at least portions of the response data when sensitive data has been detected. At block 416, the WSS may employ quarantine and data modification logic to update and/or modify the response data. That is, updated response data (e.g., updated response data 380 of FIGS. 3A-3B) may be generated at block 416. For instance, the WSS may quarantine and/or modify certain types of sensitive response data. In some embodiments, the sensitive data may be encrypted for before transmission to the client-computing device. Thus, the updated response data may include encrypted sensitive data. In other embodiments, the sensitive data may be redacted from the response data. Thus, the updated response data may be a subset of the response data. The quarantine and data modification logic may be used to detect "highly sensitive" data or information in the response data or the updated response data. In some embodiments, whether or not the response data includes sensitive data, the updated response data may be equivalent to the response data. That is, in some embodiments, the response data may not be updated. At decision block 418, method 400 may fork. If the updated response data includes highly sensitive information, method 400 may flow to block 420. Otherwise, method 400 may flow to block 424.

At block 420, the cache instructions may be updated to indicate that the no response data is to be cached at the client side. That is, the cache instructions included in response are updated and/or generated to indicate that the subset of the response data to be cached at the SW virtual cache 228 of FIGS. 2-3A is the null set. At block 422, the sandbox instructions may be updated to indicate that the entirety of the response data of the response is to be sandboxed at the web application sandbox 214 of FIGS. 2-3A. From block 422, method 400 may flow to block 434.

At block 424, service worker (SW) caching logic may be applied to identify a SW cache subset of the response data. The caching logic proxy module 244 of FIG. 2 may implement the SW caching logic. The SW cache subset of response data may be a subset of the sensitive data that is to be prohibited from being cached by the service worker at the client computing device (e.g., subset 282 of the updated response data 380 of FIG. 3B). Also at block 424, WSS cache logic may be applied to identify a WSS cache subset of response data. The caching logic proxy module 244 may implement the WSS caching logic. The WSS cache subset of response data may be a subset of the updated response data that is to be cached at the WSS (e.g., subset 286 of the updated response data 380 of FIG. 3B). At block 426, the WSS subset of the updated response data may be cached at the WSS. For example, the caching logic proxy module 244 may be enabled to cache the WSS subset of the updated response data in the web security virtual cache 250 of FIG. 2.

At block 428, sandbox logic may be applied to the updated response data to identify and/or detect a sandbox subset of the updated response data. The sandbox logic proxy module 246 of FIG. 2 may implement the sandbox logic logic. The sandbox subset of updated response data may be a subset of the sensitive data that is to be sandboxed by the service worker at web application sandbox 214 of FIG. 2. The sandbox subset of the updated response data may be subset 384 of the updated response data 380 of FIG. 3B). At block 430, the cache instructions of the response may be updated to indicate that the SW cache subset of the updated response data is not to be cached at the client side. That is, the updated cache instructions in the updated response (e.g., the updated SW cache instructions 372 in the updated response 370 of FIGS. 3A-3B) indicate that no portion of subset of the updated response data identified in block 424 are to be cached at the SW virtual cache 228 of FIG. 2). At block 432, the sandbox instructions of the response may be updated to indicate that the sandbox subset of the updated response data is to be sandboxed at the client side. That is, the updated sandbox instructions in the updated response (e.g., the updated web application sandbox instructions 374 in the updated response 370 of FIGS. 3A-3B) indicate that the subset of the updated response data identified in block 428 are to be sandboxed at the web application sandbox 214 of FIG. 2). At block 434, the updated response, including the updated response data, the updated cache instructions, and the updated sandbox instructions may be provided to the web client.

Other Embodiments

The embodiments may be directed towards one or more of methods, system, and/or non-transitory computer readable storage media. In some embodiments, a computer-implemented method for controlling information is provided. The method includes receiving, at a security service, a response that includes response data and that was transmitted from a second computing device in response to receiving an information request from a first computing device that implements a service worker. The method further includes identifying, at the security service, sensitive data included in the response data, the response further including caching instructions that instruct the service worker to cache the sensitive data at the first computing device. The method further includes, in response to identifying the sensitive data, updating, at the security service, the caching instructions such that any portion of the response data that the updated caching instructions instruct the service worker to cache at the first computing device excludes the sensitive data. The method further includes transmitting, from the security service to the first computing device, an updated response that includes the response data and the updated caching instructions. Advantageously, by controlling the persistency and re-usability of sensitive information provided to the computing system, security of a computing system may be improved, and by controlling which portions of response data may be cached at a user's computing device and which portions of the response data may be cached at a proxy service employed by the user, the performance of remote applications may be improved, computing resources are reduced and bandwidth is conserved.

In any combination of the above embodiments, in response to determining that the response does not include an indication that the response data includes sensitive data, analyzing the response data to identify the sensitive data.

In any combination of the above embodiments, in response to identifying the sensitive data, providing an alert that indicates that the response includes sensitive data.

In any combination of the above embodiments, in response to identifying the sensitive data, including in the updated response sandbox instructions that instruct the service worker to isolate the sensitive data in a sandbox implemented at the first computing device.

In any combination of the above embodiments, employing caching logic, at the security service, to identify a portion of the response data to be cached at the security service; storing, in cache memory at the security service, the portion of the response data identified with the caching logic; receiving, at the security service, another information request that includes a request for the portion of the response data identified with the caching logic, wherein the other information request is received from a third computing device; and employing the cache memory at the security service to provide the portion of the response data identified with the caching logic to the third computing device.

In any combination of the above embodiments, employing caching logic, at the security service, to identify a portion of the response data to be cached at the first computing device; and updating, at the security service, the caching instructions such that the updated caching instructions instruct the service worker to cache the portion of the response data identified with the caching logic at the first computing device.

In any combination of the above embodiments, updating the caching instructions includes inserting one or more application programming interface (API) function calls into the caching instructions.

In some embodiments, a computing system comprising at least one hardware processor, and one or more non-transitory computer-readable media, having executable instructions embodied thereon, which, when executed by the at least one hardware processor, cause the at least one hardware processor perform operations. The operations include receiving, at a security service, a response that includes response data and that was transmitted from a second computing device in response to receiving an information request from a first computing device that implements a service worker. The operations further include identifying, at the security service, sensitive data included in the response data, the response further including caching instructions that instruct the service worker to cache the sensitive data at the first computing device. The operations further include, in response to identifying the sensitive data, updating, at the security service, the caching instructions such that any portion of the response data that the updated caching instructions instruct the service worker to cache at the first computing device excludes the sensitive data. The operations further include transmitting, from the security service to the first computing device, an updated response that includes the response data and the updated caching instructions. Advantageously, by controlling the persistency and re-usability of sensitive information provided to the computing system, security of a computing system may be improved, and by controlling which portions of response data may be cached at a user's computing device and which portions of the response data may be cached at a proxy service employed by the user, the performance of remote applications may be improved, computing resources are reduced and bandwidth is conserved.

In any combination of the above embodiments, the operations further include, in response to determining that the response does not include an indication that the response data includes sensitive data, analyzing the response data to identify the sensitive data.

In any combination of the above embodiments, the operations further include, in response to identifying the sensitive data, providing an alert that indicates that the response includes sensitive data.

In any combination of the above embodiments, the operations further include, in response to identifying the sensitive data, including in the updated response sandbox instructions that instruct the service worker to isolate the sensitive data in a sandbox implemented at the first computing device.

In any combination of the above embodiments, the operations further include employing caching logic, at the security service, to identify a portion of the response data to be cached at the security service; storing, in cache memory at the security service, the portion of the response data identified with the caching logic; receiving, at the security service, another information request that includes a request for the portion of the response data identified with the caching logic, wherein the other information request is received from a third computing device; and employing the cache memory at the security service to provide the portion of the response data identified with the caching logic to the third computing device.

In any combination of the above embodiments, the operations further include employing caching logic, at the security service, to identify a portion of the response data to be cached at the first computing device; and updating, at the security service, the caching instructions such that the updated caching instructions instruct the service worker to cache the portion of the response data identified with the caching logic at the first computing device.

In any combination of the above embodiments, updating the caching instructions includes inserting one or more application programming interface (API) function calls into the caching instructions.

In some embodiments, one or more computer storage media having computer-usable instructions embodied thereon that, when used by at least one computing device, cause the at least one computing device to perform actions. The actions include receiving, at a security service, a response that includes response data and that was transmitted from a second computing device in response to receiving an information request from a first computing device that implements a service worker. The actions further include identifying, at the security service, sensitive data included in the response data, the response further including caching instructions that instruct the service worker to cache the sensitive data at the first computing device. The actions further include, in response to identifying the sensitive data, updating, at the security service, the caching instructions such that any portion of the response data that the updated caching instructions instruct the service worker to cache at the first computing device excludes the sensitive data. The actions further include transmitting, from the security service to the first computing device, an updated response that includes the response data and the updated caching instructions. Advantageously, by controlling the persistency and re-usability of sensitive information provided to the computing system, security of a computing system may be improved, and by controlling which portions of response data may be cached at a user's computing device and which portions of the response data may be cached at a proxy service employed by the user, the performance of remote applications may be improved, computing resources are reduced and bandwidth is conserved.

In any combination of the above embodiments, the actions further include, in response to determining that the response does not include an indication that the response data includes sensitive data, analyzing the response data to identify the sensitive data.

In any combination of the above embodiments, the actions further include, in response to identifying the sensitive data, providing an alert that indicates that the response includes sensitive data.

In any combination of the above embodiments, the actions further include, in response to identifying the sensitive data, including in the updated response sandbox instructions that instruct the service worker to isolate the sensitive data in a sandbox implemented at the first computing device.

In any combination of the above embodiments, the actions further include employing caching logic, at the security service, to identify a portion of the response data to be cached at the security service; storing, in cache memory at the security service, the portion of the response data identified with the caching logic; receiving, at the security service, another information request that includes a request for the portion of the response data identified with the caching logic, wherein the other information request is received from a third computing device; and employing the cache memory at the security service to provide the portion of the response data identified with the caching logic to the third computing device In any combination of the above embodiments, the actions further include employing caching logic, at the security service, to identify a portion of the response data to be cached at the first computing device; and updating, at the security service, the caching instructions such that the updated caching instructions instruct the service worker to cache the portion of the response data identified with the caching logic at the first computing device.

Generalized Computing Device

Figure 5:
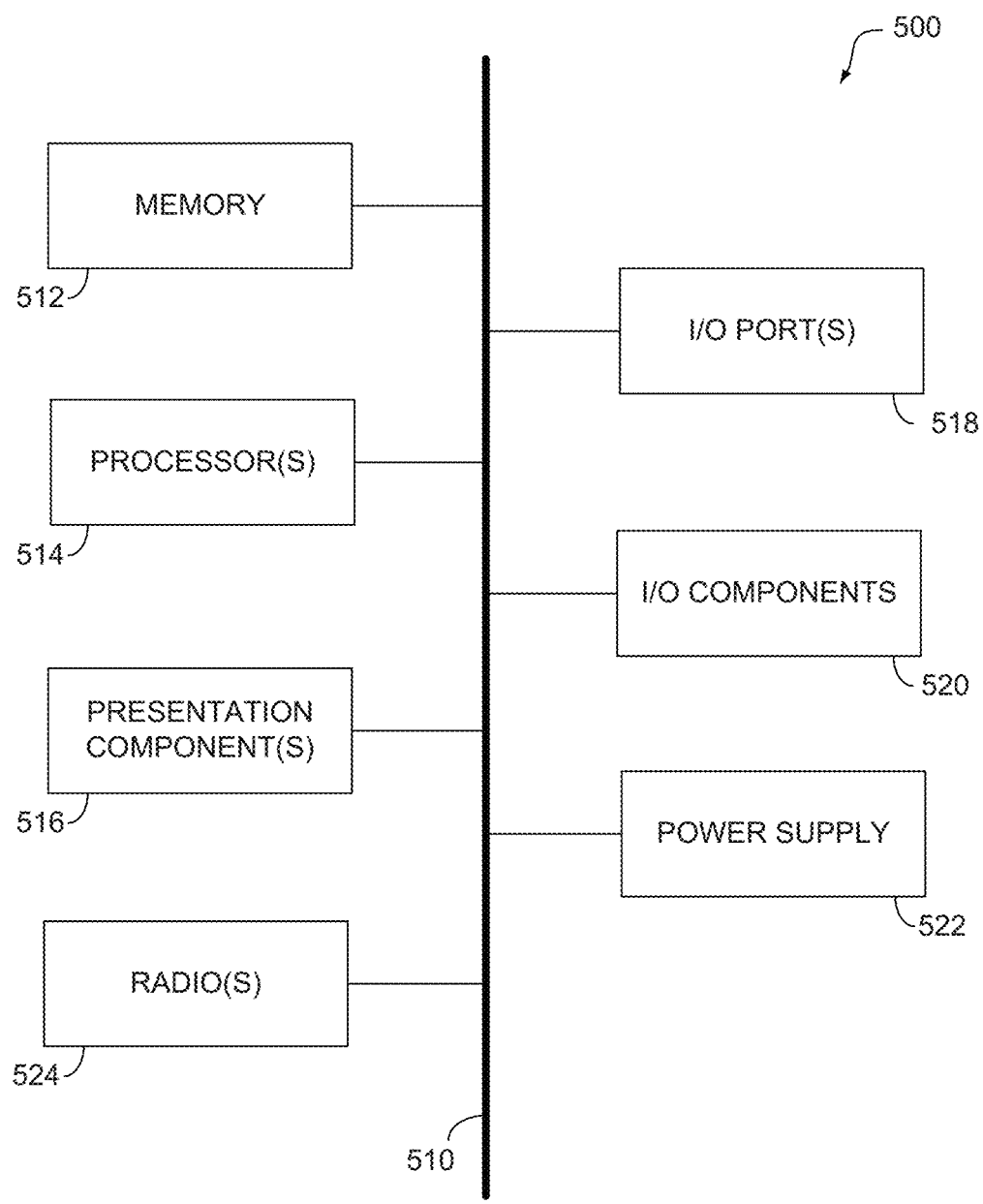
FIG. 5 is a block diagram of an exemplary computing device for use in implementing aspects of the technology described herein.

With reference to FIG. 5, computing device 500 includes a bus 510 that directly or indirectly couples the following devices: memory 512, one or more processors 514, one or more presentation components 516, one or more input/output (I/O) ports 518, one or more I/O components 520, and an illustrative power supply 522. Bus 510 represents what may be one or more busses (such as an address bus, data bus, or combination thereof). Although the various blocks of FIG. 5 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 5 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 5 and with reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors 514 that read data from various entities such as memory 512 or I/O components 520. Presentation component(s) 516 presents data indications to a user or other device. In some implementations, presentation component 220 of system 200 may be embodied as a presentation component 516. Other examples of presentation components may include a display device, speaker, printing component, vibrating component, and the like.

The I/O ports 518 allow computing device 500 to be logically coupled to other devices, including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as stereoscopic camera systems, infrared camera systems, RGB camera systems, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

Some embodiments of computing device 500 may include one or more radio(s) 524 (or similar wireless communication components). The radio 524 transmits and receives radio or wireless communications. The computing device 500 may be a wireless terminal adapted to receive communications and media over various wireless networks. Computing device 500 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present disclosure.

By way of example, the technical solution system can include an Application Programming Interface (API) library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present disclosure are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

Embodiments of the present disclosure have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method for controlling information, the method comprising:
    receiving, at a security service, a response from a second computing device that includes response data addressed to a first computing device;
    identifying, at the security service, sensitive data included in the response data, the response further including caching instructions that instruct a service worker to cache the sensitive data at the first computing device;
    in response to identifying the sensitive data, updating, at the security service, the caching instructions to form updated caching instructions that instruct the service worker to exclude the sensitive data from caching at the first computing device;
    in response to identifying the sensitive data, including, in an updated response, sandbox instructions that instruct the service worker to isolate the sensitive data in a sandbox implemented at the first computing device; and
    transmitting, from the security service to the first computing device, the updated response that includes the response data and the updated caching instructions.

2. The method of claim 1, further comprising:
    in response to determining that the response does not include an indication that the response data includes sensitive data, analyzing the response data to identify the sensitive data.

3. The method of claim 1, further comprising:
    in response to identifying the sensitive data, providing an alert to a user of the first computing device that indicates that the response includes sensitive data.

4. The method of claim 1, further comprising:
    employing caching logic, at the security service, to identify a portion of the response data to be cached at the security service;
    storing, in cache memory at the security service, the portion of the response data identified with the caching logic;
    receiving, at the security service, another information request that includes a request for the portion of the response data identified with the caching logic, wherein the other information request is received from a third computing device; and employing the cache memory at the security service to provide the portion of the response data identified with the caching logic to the third computing device.

5. The method of claim 1, further comprising:
employing caching logic, at the security service, to identify a portion of the response data to be cached at the first computing device; and
updating, at the security service, the caching instructions such that the updated caching instructions instruct the service worker to cache the portion of the response data identified with the caching logic at the first computing device.

6. The method of claim 1, wherein updating the caching instructions includes inserting one or more application programming interface (API) function calls into the caching instructions.

7. A system comprising:
at least one hardware processor; and
one or more computer storage media having executable instructions embodied thereon, which, when executed by the at least one hardware processor, cause the at least one hardware processor to perform operations comprising:
receiving, at a security service, a response from a second computing device that includes response data addressed to a first computing device;
identifying, at the security service, sensitive data included in the response data, the response further including caching instructions that instruct a service worker to cache the sensitive data at the first computing device;
in response to identifying the sensitive data, updating, at the security service, the caching instructions to form updated caching instructions that instruct the service worker to exclude the sensitive data from caching at the first computing device;
in response to identifying the sensitive data, including, in an updated response, sandbox instructions that instruct the service worker to isolate the sensitive data in a sandbox implemented at the first computing device; and
transmitting, from the security service to the first computing device, the updated response that includes the response data and the updated caching instructions.

8. The system of claim 7, wherein the operations further comprise:
in response to determining that the response does not include an indication that the response data includes sensitive data, analyzing the response data to identify the sensitive data.

9. The system of claim 7, wherein the operations further comprise:
in response to identifying the sensitive data, providing an alert to a user of the first computing device that indicates that the response includes sensitive data.

10. The system of claim 7, wherein the operations further comprise:
employing caching logic, at the security service, to identify a portion of the response data to be cached at the security service;
storing, in cache memory at the security service, the portion of the response data identified with the caching logic;
receiving, at the security service, another information request that includes a request for the portion of the response data identified with the caching logic, wherein the other information request is received from a third computing device; and
employing the cache memory at the security service to provide the portion of the response data identified with the caching logic to the third computing device.

11. The system of claim 7, wherein the operations further comprise:
employing caching logic, at the security service, to identify a portion of the response data to be cached at the first computing device; and
updating, at the security service, the caching instructions such that the updated caching instructions instruct the service worker to cache the portion of the response data identified with the caching logic at the first computing device.

12. The system of claim 7, wherein updating the caching instructions includes inserting one or more application programming interface (API) function calls into the caching instructions.

13. Computer storage media storing computer-useable instructions that, when used by at least one computing device, cause the at least one computing device to perform actions comprising:
receiving, at a security service, a response from a second computing device that includes response data addressed to a first computing device;
identifying, at the security service, sensitive data included in the response data, the response further including caching instructions that instruct a service worker to cache the sensitive data at the first computing device;
in response to identifying the sensitive data, updating, at the security service, the caching instructions to form updated caching instructions that instruct the service worker to exclude the sensitive data from caching at the first computing device;
in response to identifying the sensitive data, including, in an updated response, sandbox instructions that instruct the service worker to isolate the sensitive data in a sandbox implemented at the first computing device; and
transmitting, from the security service to the first computing device, the updated response that includes the response data and the updated caching instructions.

14. The media of claim 13, wherein the actions further comprise:
in response to determining that the response does not include an indication that the response data includes sensitive data, analyzing the response data to identify the sensitive data.

15. The media of claim 13, wherein the actions further comprise:
in response to identifying the sensitive data, providing an alert to a user of the first computing device that indicates that the response includes sensitive data.

16. The media of claim 13, wherein the actions further comprise:
employing caching logic, at the security service, to identify a portion of the response data to be cached at the security service;
storing, in cache memory at the security service, the portion of the response data identified with the caching logic;
receiving, at the security service, another information request that includes a request for the portion of the response data identified with the caching logic, wherein the other information request is received from a third computing device; and employing the cache memory at the security service to provide the portion of the response data identified with the caching logic to the third computing device.

17. The media of claim 13, wherein the actions further comprise:
   employing caching logic, at the security service, to identify a portion of the response data to be cached at the first computing device; and
   updating, at the security service, the caching instructions such that the updated caching instructions instruct the service worker to cache the portion of the response data identified with the caching logic at the first computing device.

\* \* \* \* \*